United States Patent
Luo et al.

(10) Patent No.: US 11,743,743 B2
(45) Date of Patent: Aug. 29, 2023

(54) SUPPORTING ANALOG REPEATER WITH BEAM SWEEP

(71) Applicant: QUALCOMM Incorporated, San Diego, CA (US)

(72) Inventors: Jianghong Luo, Skillman, NJ (US); Junyi Li, Franklin Park, NJ (US); Navid Abedini, Basking Ridge, NJ (US); Ashwin Sampath, Skillman, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/249,856

(22) Filed: Mar. 16, 2021

(65) Prior Publication Data

US 2021/0297870 A1    Sep. 23, 2021

Related U.S. Application Data

(60) Provisional application No. 62/992,463, filed on Mar. 20, 2020.

(51) Int. Cl.
*H04W 16/28* (2009.01)
*H04L 1/08* (2006.01)
*H04W 72/044* (2023.01)
*H04W 24/04* (2009.01)
*H04W 72/0453* (2023.01)

(52) U.S. Cl.
CPC ............... *H04W 16/28* (2013.01); *H04L 1/08* (2013.01); *H04W 24/04* (2013.01); *H04W 72/046* (2013.01); *H04W 72/0453* (2013.01)

(58) Field of Classification Search
CPC . H04W 16/28; H04W 24/04; H04W 72/0453; H04W 72/046; H04W 84/047; H04L 1/08; H04L 1/1858; H04L 1/189; H04L 1/1671; H04L 1/1887; H04L 2001/0093; H04B 7/145; H04B 7/0617; H04B 7/0623; H04B 7/0632; H04B 7/15507
See application file for complete search history.

(56) References Cited

U.S. PATENT DOCUMENTS 9,832,754 B1    11/2017 Akkarakaran et al.
10,014,884 B1 *  7/2018 Dresser ................... H04B 1/40
(Continued)

FOREIGN PATENT DOCUMENTS

WO    2018067307 A1    4/2018

OTHER PUBLICATIONS

International Search Report and Written Opinion—PCT/US2021/070278—ISA/EPO—dated Jun. 21, 2021.

*Primary Examiner* — Yuwen Pan
*Assistant Examiner* — Angelica Perez
(74) *Attorney, Agent, or Firm* — Harrity & Harrity, LLP

(57) ABSTRACT

Various aspects of the present disclosure generally relate to wireless communication. In some aspects, a repeater may steer a narrow beam in a plurality of directions in a time sequence according to a beam sweep pattern, and retransmit one or more communications between a base station and one or more user equipments (UEs) using at least the narrow beam in the beam sweep pattern. A base station may determine a beam sweep pattern of the repeater based at least in part on feedback from the UEs. Numerous other aspects are provided.

30 Claims, 7 Drawing Sheets

(56) References Cited

U.S. PATENT DOCUMENTS

| | | | |
|---|---|---|---|
| 2018/0076874 A1 | 3/2018 | McLellan et al. | |
| 2019/0181943 A1* | 6/2019 | Liang | H04B 7/2606 |
| 2019/0312625 A1* | 10/2019 | Liang | H04B 7/0617 |
| 2020/0068485 A1 | 2/2020 | Zhou et al. | |
| 2021/0194756 A1* | 6/2021 | Babaei | H04W 74/0808 |
| 2022/0369121 A1 | 11/2022 | Islam et al. | |

* cited by examiner

SUPPORTING ANALOG REPEATER WITH BEAM SWEEP

CROSS-REFERENCE TO RELATED APPLICATION

This patent application claims priority to U.S. Provisional Patent Application No. 62/992,463, filed on Mar. 20, 2020, entitled "SUPPORTING ANALOG REPEATER WITH BEAM SWEEP," and assigned to the assignee hereof. The disclosure of the prior Application is considered part of and is incorporated by reference into this patent application.

FIELD OF THE DISCLOSURE

Aspects of the present disclosure generally relate to wireless communication and to techniques and apparatuses for supporting a repeater with a beam sweep.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" or "forward link" refers to the communication link from the BS to the UE, and "uplink" or "reverse link" refers to the communication link from the UE to the BS. As will be described in more detail herein, a BS may be referred to as a Node B, a gNB, an access point (AP), a radio head, a transmit receive point (TRP), a New Radio (NR) BS, or a 5G Node B.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE, NR, and other radio access technologies.

SUMMARY

In some aspects, a method of wireless communication, performed by a repeater, may include steering a narrow beam in a plurality of directions in a time sequence according to a beam sweep pattern, and retransmitting one or more communications between a base station and one or more user equipments (UEs) using at least the narrow beam in the beam sweep pattern.

In some aspects, a method of wireless communication, performed by a base station, may include determining a beam sweep pattern of a repeater that steers a narrow beam in a plurality of directions in a time sequence to retransmit communications between the base station and one or more UEs, based at least in part on feedback from the one or more UEs. The method may include scheduling the one or more UEs based at least in part on the determined beam sweep pattern.

In some aspects, a repeater for wireless communication may include a memory and one or more processors operatively coupled to the memory. The memory and the one or more processors may be configured to steer a narrow beam in a plurality of directions in a time sequence according to a beam sweep pattern, and retransmit one or more communications between a base station and one or more UEs using at least the narrow beam in the beam sweep pattern.

In some aspects, a base station for wireless communication may include a memory and one or more processors operatively coupled to the memory. The memory and the one or more processors may be configured to determine a beam sweep pattern of a repeater that steers a narrow beam in a plurality of directions in a time sequence to retransmit communications between the base station and one or more UEs, based at least in part on feedback from the one or more UEs, and schedule the one or more UEs based at least in part on the determined beam sweep pattern.

In some aspects, a non-transitory computer-readable medium may store one or more instructions for wireless communication. The one or more instructions, when executed by one or more processors of a repeater, may cause the one or more processors to steer a narrow beam in a plurality of directions in a time sequence according to a beam sweep pattern, and retransmit one or more communications between a base station and one or more UEs using at least the narrow beam in the beam sweep pattern.

In some aspects, a non-transitory computer-readable medium may store one or more instructions for wireless communication. The one or more instructions, when executed by one or more processors of a base station, may cause the one or more processors to determine a beam sweep pattern of a repeater that steers a narrow beam in a plurality of directions in a time sequence to retransmit communications between the base station and one or more UEs, based at least in part on feedback from the one or more UEs, and schedule the one or more UEs based at least in part on the determined beam sweep pattern.

In some aspects, an apparatus for wireless communication may include means for steering a narrow beam in a plurality of directions in a time sequence according to a beam sweep pattern, and means for retransmitting one or more communications between a base station and one or more UEs using at least the narrow beam in the beam sweep pattern.

In some aspects, an apparatus for wireless communication may include means for determining a beam sweep pattern of a repeater that steers a narrow beam in a plurality of directions in a time sequence to retransmit communications between the base station and one or more UEs, based at least in part on feedback from the one or more UEs, and means for scheduling the one or more UEs based at least in part on the determined beam sweep pattern.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
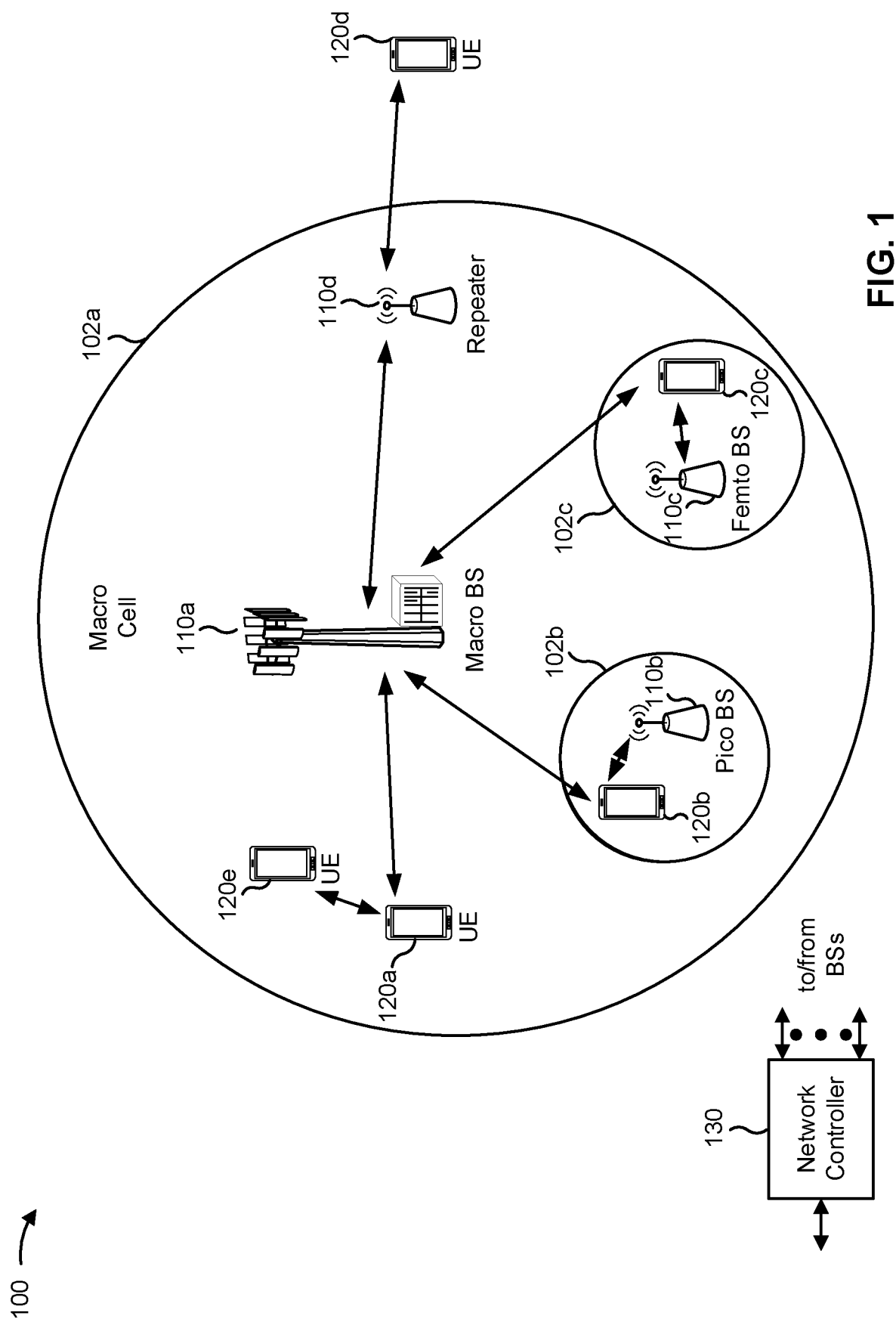
FIG. 1 is a diagram illustrating an example of a wireless communication network, in accordance with the present disclosure.

FIG. 1 is a diagram illustrating an example of a wireless network 100 in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, or a transmit receive point (TRP). Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, or a virtual network using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, or a relay.

Wireless network 100 may be a heterogeneous network that includes BSs of different types, such as macro BSs, pico BSs, femto BSs, and/or relay BSs. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, and/or an air interface. A frequency may also be referred to as a carrier, and/or a frequency channel Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, or a vehicle-to-infrastructure (V2I) protocol), and/or a mesh network. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

Figure 2:
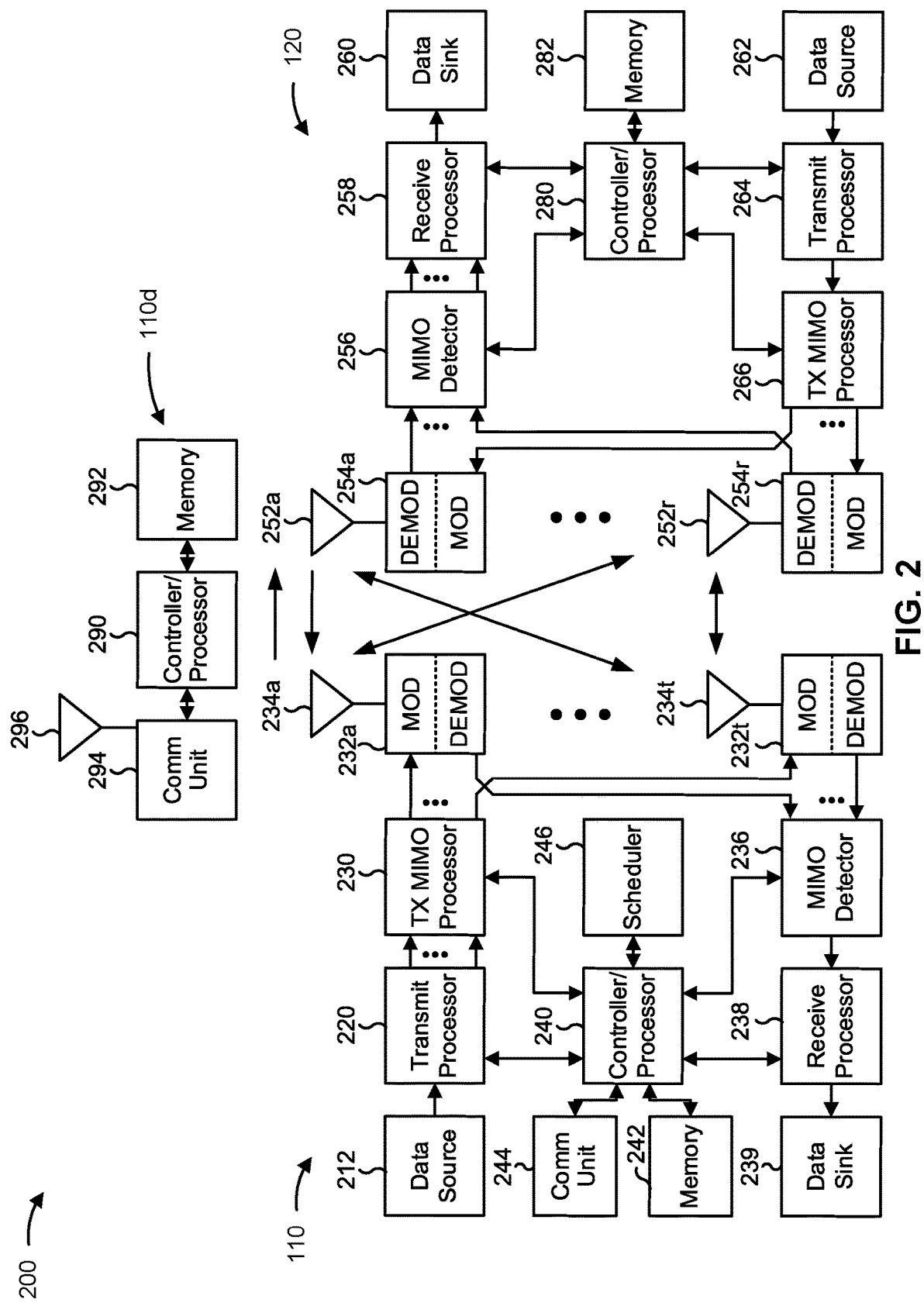
FIG. 2 is a diagram illustrating an example of a base station in communication with a user equipment in a wireless communication network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCSs) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, upper layer signaling) and provide overhead symbols and control symbols. Transmit processor 220 may also generate reference symbols for reference signals (e.g., a cell-specific reference signal (CRS), a demodulation reference signal (DMRS)) and synchronization signals (e.g., the primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), and/or CQI, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM), and transmitted to base station 110. In some aspects, a modulator and a demodulator (e.g., MOD/DEMOD 254) of UE 120 may be included in a modem of UE 120. In some aspects, UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 1-7).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of base station 110 may be included in a modem of base station 110. In some aspects, base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 1-7).

At repeater 110d, downlink signals may be received from base station 110 via antennas 296 and retransmitted to UE 120 via antennas 296. Uplink signals may be received from UE 120 via antennas 296 and retransmitted to base station 110 via antennas 296. Repeater 110d may include communication unit 294, controller/processor 290, and memory 292 to assist with retransmission. Repeater 110d may further include one or more components of base station 110 such as a transmit processor, a receive processor, and/or a MIMO processor. However, if repeater 110d is an analog repeater, repeater 110d may have not have a transmit processor, a receive processor, or other components of base station 110 such as MODs, DEMODs, or other signal processors.

Base station 110 may include communication unit 244 and communicate with network controller 130 via communication unit 244. Network controller 130 may include components shown for repeater 110d, such as communication unit 294, controller/processor 290, and memory 292.

Controller/processor 240 of base station 110, controller/processor 280 of UE 120, repeater 110d, and/or any other component(s) of FIG. 2 may perform one or more techniques associated with supporting an analog repeater with a beam sweep, as described in more detail elsewhere herein. For example, controller/processor 240 of base station 110, controller/processor 280 of UE 120, controller/processor 290 of repeater 110d, and/or any other component(s) of FIG. 2 may perform or direct operations of, for example, process 600 of FIG. 6, process 700 of FIG. 7, and/or other processes as described herein. Memories 242, 282, and 292 may store data and program codes for base station 110, UE 120, and repeater 110d, respectively. In some aspects, memory 242, memory 282, and/or memory 292 may comprise a non-transitory computer-readable medium storing one or more instructions for wireless communication. For example, the one or more instructions, when executed (e.g., directly, or after compiling, converting, interpreting, and/or the like) by one or more processors of the base station 110, UE 120, and/or the repeater 110d, may perform or direct operations of, for example, process 600 of FIG. 6, process 700 of FIG. 7, and/or other processes as described herein. In some aspects, executing instructions may include running the instructions, converting the instructions, compiling the instructions, interpreting the instructions, and/or the like. A scheduler 246 may schedule UEs for data transmission on the downlink and/or uplink.

In some aspects, repeater 110d may include means for steering a narrow beam in a plurality of directions in a time sequence according to a beam sweep pattern, means for retransmitting one or more communications between a base station and one or more UEs using at least the narrow beam in the beam sweep pattern, and/or the like. In some aspects, such means may include one or more components of repeater 110d described in connection with FIG. 2, such as controller/processor 290, memory 292, communication unit 294, antenna 296, and/or the like.

In some aspects, base station 110 may include means for determining a beam sweep pattern of a repeater that steers a narrow beam in a plurality of directions in a time sequence to retransmit communications between the base station and one or more UEs, based at least in part on feedback from the one or more UEs, means for scheduling the one or more UEs based at least in part on the beam sweep pattern, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
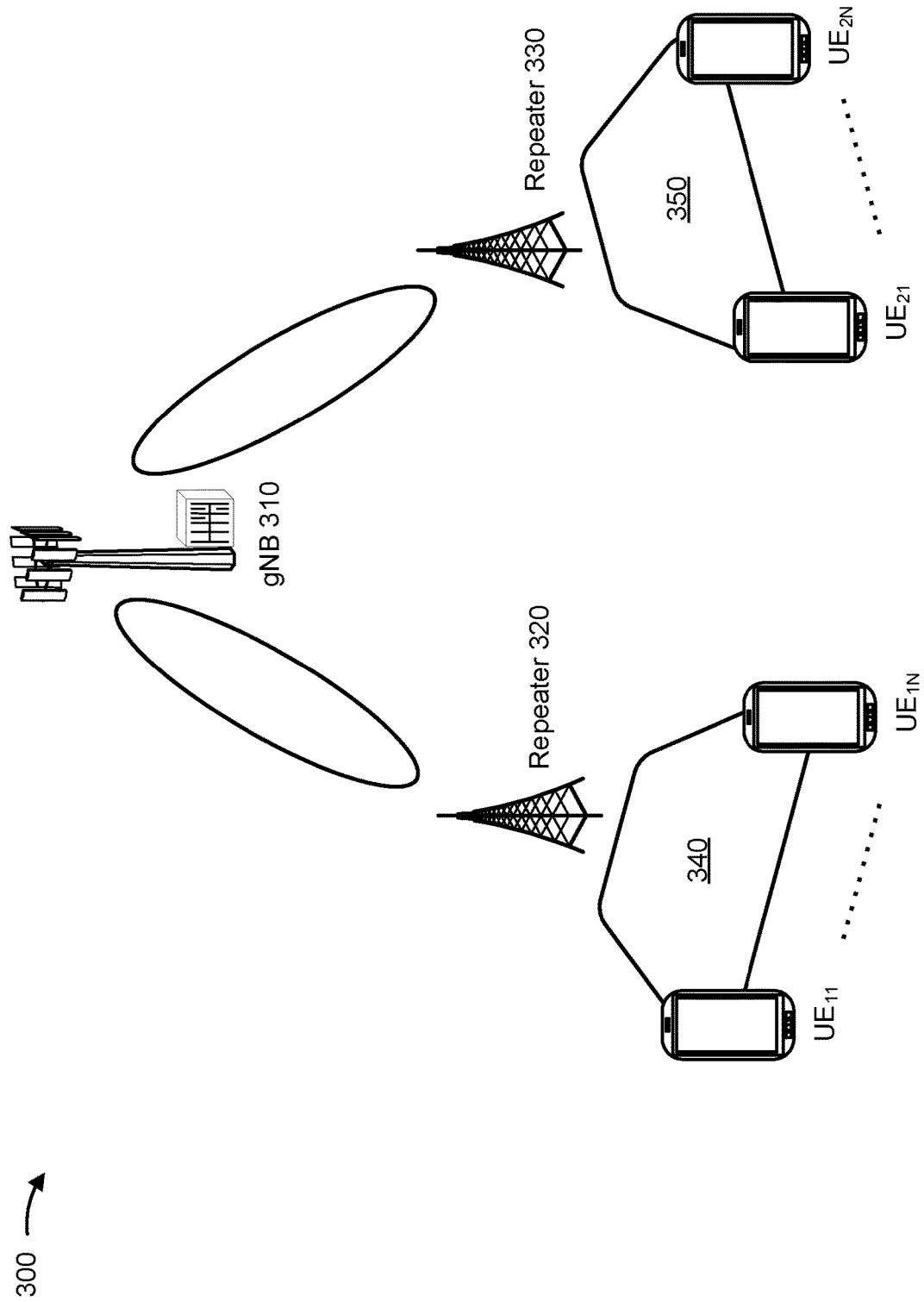
FIG. 3 is a diagram illustrating an example of a repeater, in accordance with the present disclosure.

FIG. 3 is a diagram illustrating an example 300 of a repeater, in accordance with the present disclosure. FIG. 3 shows a base station (e.g., a gNB 310) that transmits downlink communications to repeaters 320, 330, which retransmit the downlink communications to UEs. The UEs may transmit uplink communications to the repeaters 320, 330, which retransmit the uplink communications to gNB 310.

FIG. 3 shows that repeaters 320, 330 transmit communications to the UEs with wide beams 340, 350 to reach all possible UE positions. Repeaters 320, 330 may also have corresponding receive beam configurations (spatial filters) with a wide beam setting. Repeaters 320, 330 may be analog repeaters that have no means to optimize communications with the UEs.

As indicated above, FIG. 3 is provided as an example. Other examples may differ from what is described with respect to FIG. 3.

As shown in FIG. 3, a repeater may retransmit communications to UEs using a fixed broad beam so as to cover all possible unknown directions from the UEs. If the repeater is an analog repeater, the repeater may not be able to optimize communications with the UEs. In fact, the repeater may receive communications and retransmit communications regardless of a distribution (quantity and location) of the UEs. As a result, the repeater wastes energy and provides a weaker signal to UEs that are further away. This may lead to a degradation of communications, especially for UEs that may be at a cell's edge. Degraded communications may cause the UEs to waste processing resources and signaling resources.

According to various aspects described herein, a repeater, even an analog repeater, may steer a narrow beam (or multiple beams) in a beam sweep pattern. The narrow beam may provide more antenna array gain for signals to the UEs. This may improve communications with UEs that are further away. However, if the repeater is an analog repeater, or a "dumb" repeater, the repeater may not be able to optimize UE scheduling and may waste energy or possibly lose communications due to the narrow beam.

In some aspects, a base station, which may not control the repeater, may learn a beam sweep pattern of the repeater. The base station may learn the beam sweep pattern from UE feedback (e.g., CQIs, strength of signal information, acknowledgements or negative acknowledgements for physical downlink shared channel (PDSCH) transmissions). For example, if a signal is strong for a UE, the narrow band may be determined to be directed at the UE. If a signal is weaker for the UE, the narrow band may be determined to not be directed at the UE. The base station may thus schedule the UEs to take advantage of the beam sweep pattern such that a particular UE is scheduled to communicate at a time when the narrow beam is steered toward the particular UE. As a result, UE communications that use the repeater may avoid degradation and conserve processing resources and signaling resources. Some aspects may provide a cost-effective solution for an analog repeater that is not required to be a smart repeater or to receive direction from the base station.

Some aspects may also provide coverage enhancement for repeaters that use millimeter wave (mmWave) frequency bands with dense UE deployments. Some mmWave communication systems may be vulnerable to blockages due to higher penetration loss and reduced diffraction. Densification for coverage may be important in an mmWave communication system, which may require a large quantity of nodes. Analog repeaters may provide a cost-effective solution for such densification in the mmWave communication system.

Figure 4:
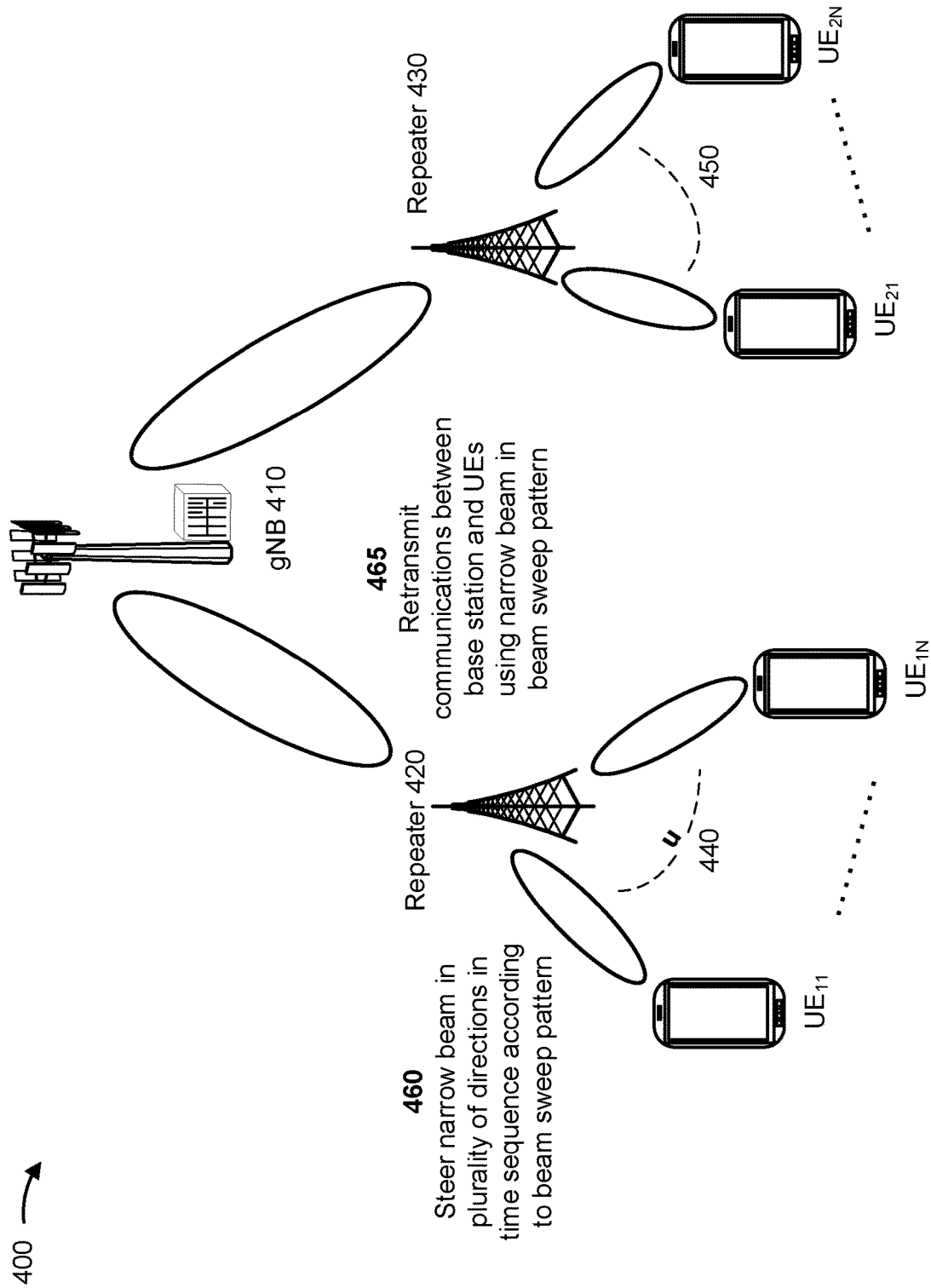
FIG. 4 is a diagram illustrating an example of analog repeaters with beam sweep patterns, in accordance with the present disclosure.

FIG. 4 is a diagram illustrating an example 400 of analog repeaters with a beam sweep pattern, in accordance with the present disclosure. FIG. 4 shows a base station (e.g., a gNB 410) that transmits downlink communications to repeaters 420, 430, which retransmit the downlink communications to UEs. The UEs may transmit uplink communications to the repeaters 420, 430, which retransmit the uplink communications to gNB 410.

As shown by reference number 460, repeater 420 may steer a narrow beam in a plurality of directions in a time sequence according to a beam sweep pattern 440. Repeater 420 may be an analog repeater with analog components and no digital signal processing chain. Repeater 420 may be preprogrammed with beam sweep pattern 440, which is independent of control or synchronization by gNB 410. Beam sweep pattern 440 may include amplifying a signal from an antenna array of repeater 420 in a first beam direction for a first period of time, amplifying the signal in a second beam direction for a second period of time, and so forth. The first period of time and the second period of time may not overlap.

Beam sweep pattern 440 may be configured such that a UE does not detect beam failures frequently. The first period of time, the second period of time, and/or other periods of time may be equal to or greater than a periodicity of reference signals for beam failure detection (e.g., 20 milliseconds of a synchronization signal block or a channel state information reference signal). In some aspects, a quantity of beam positions in beam sweep pattern 440 may be configured to be less than a maximum count of beam failure instances (e.g., 1, 2, 3, 4, 5, 6, 8, or 10).

In some aspects, beam sweep pattern 440 may be configured based at least in part on long-term statistical information on UE populations at different directions at various times. A distribution of UEs may change depending on time of day and day of the week.

As shown by reference number 465, repeater 420 may retransmit communications between gNB 410 and the UEs using at least the narrow beam in beam sweep pattern 440. For example, repeater 420 may receive a communication using the narrow beam in beam sweep pattern 440 and transmit the communication on a fixed narrow beam to gNB 410. That is, using at least the narrow beam in the beam sweep pattern for retransmission may include using the narrow beam in beam sweep pattern 440 to receive the communication from a UE but not for transmitting the communication to gNB 410.

Repeater 420 may amplify and forward a received signal with the communication in an analog domain. Repeater 420 may retransmit communications in an mmWave frequency band. Repeater 420 may have a beam sweep pattern 440 that is different from a beam sweep pattern 450 of repeater 430. For example, beam sweep pattern 440 may have a different quantity of beam positions and/or a different beam sweep periodicity.

As indicated above, FIG. 4 is provided as an example. Other examples may differ from what is described with respect to FIG. 4.

Figure 5:
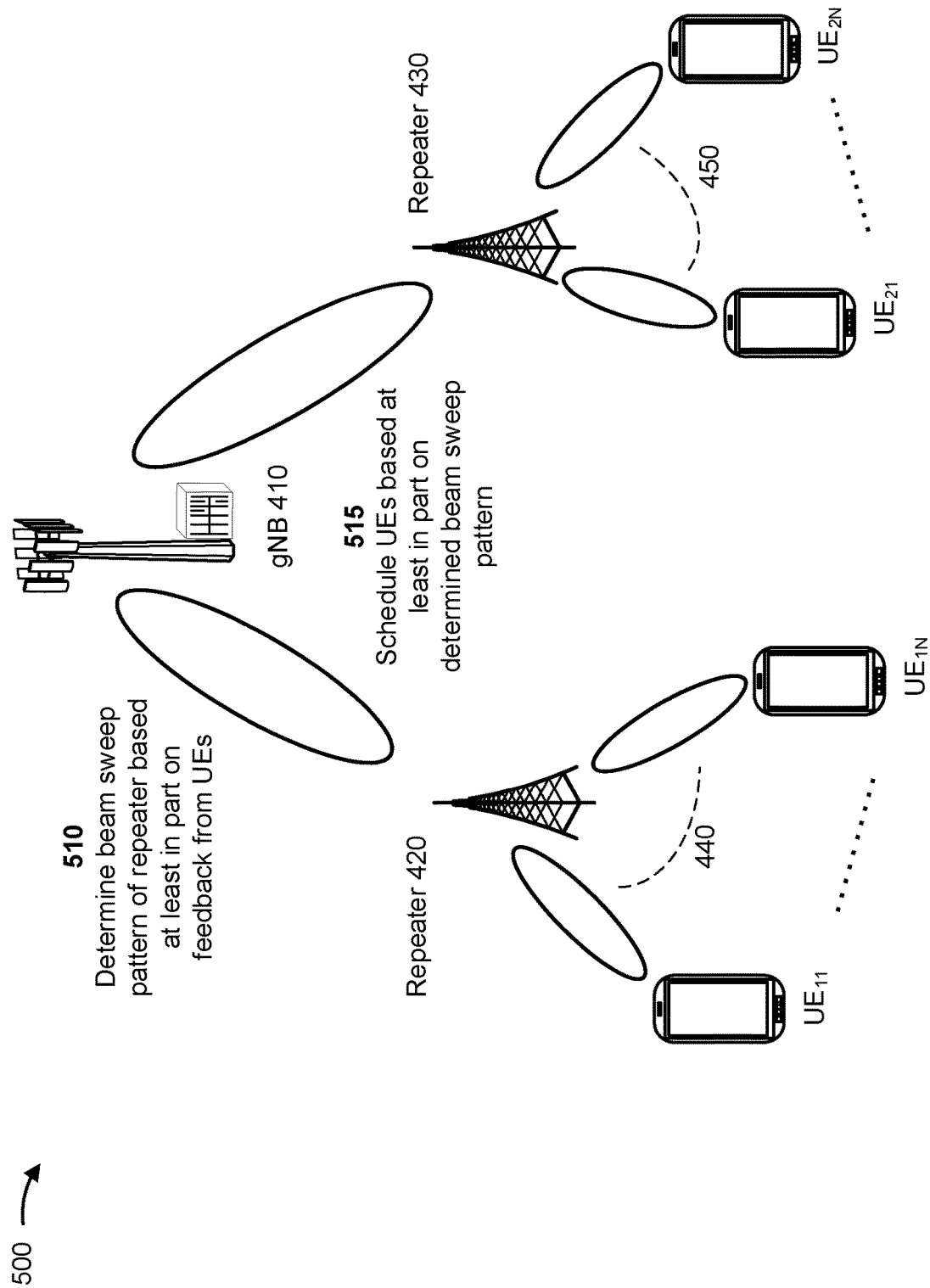
FIG. 5 is a diagram illustrating an example of supporting an analog repeater with a beam sweep, in accordance with the present disclosure.

FIG. 5 is a diagram illustrating an example 500 of supporting an analog repeater with a beam sweep, in accordance with the present disclosure. FIG. 5 shows gNB 410 and repeaters 420, 430 that are described in connection with FIG. 4. Example 500 may be an extension of example 400.

For respective UEs connected to gNB 410 via repeater 420, a beam sweep impact from repeater 420 may be viewed as a fading channel Many of the UEs may transmit feedback, such as a CQI, or an acknowledgement or negative acknowledgement of a UE-specific PDSCH transmission to gNB 410. As shown by reference number 510, gNB 410 may learn of channel fluctuations at the UEs, based at least in part on feedback from the UEs, and determine a beam sweep pattern of repeater 420.

In some aspects, gNB 410 may determine the beam sweep pattern that gNB 410 is using by identifying a direction of the narrow beam at different times along a time sequence. gNB 410 may identify a direction of the narrow beam at a point in the time sequence based at least in part on an indicator of a relatively strong signal to a particular UE or an acknowledgement message from the particular UE in combination with location information for the particular UE. Correspondingly, gNB 410 may identify a direction that the narrow beam is not pointing toward at a point in the time sequence based at least in part on an indicator of a weak signal to a particular UE or a negative acknowledgement from the particular UE. The time sequence may be based at least in part on an initial period for a complete beam sweep of repeater 420 or a learned period for the complete beam sweep.

As shown by reference number 515, gNB 410 may schedule UEs based at least in part on beam sweep pattern 440 that gNB 410 determined. For example, gNB 410 may optimize scheduling such that a UE is scheduled to communicate when the beam is steered toward the UE and to not communicate when the beam is not steered toward the UE. In other words, gNB 410 is optimizing communications with UEs based on learning a beam sweep pattern of another network device that is in communication with the UEs, rather than merely tuning a beam sweep pattern of gNB 410. In fact, a beam from gNB 410 to repeater 420 may be fixed.

In some aspects, gNB 410 may use a proportional fairshare scheduler or a channel-aware scheduler and may prioritize scheduling for UEs with a good channel quality but a low throughput for each active period of time. Scheduling accuracy may vary based at least in part on whether CQI is periodic, semi-persistent, or aperiodic. More frequent UE feedback may provide more accuracy but frequent feedback may also increase signaling overhead.

While repeater 420 is described to be an analog repeater, in some aspects, a repeater may have extended capabilities. For example, repeater 430 may be a repeater that has digital processing chain or that may receive some control signaling from gNB 410. gNB 410 may have acquired information regarding a UE distribution from UE feedback. gNB 410 may provide such information to repeater 430, and repeater 430 may configure or reconfigure beam sweep pattern 450 based at least in part on the information. Repeater 430 may adjust a quantity of beam positions, beam directions, active time for a beam direction, and/or the like based at least in part on information regarding a UE distribution. For example, repeater 430 may reduce an active time for a beam direction that has no UEs and increase an active time for a beam direction with connected UEs. The configuration may be long-term (not requiring tight timing or synchronization between gNB 410 and repeater 430), or the configuration may be more dynamic to provide for more frequent adjustments. In other words, a beam sweep pattern with a narrow beam may be used by an analog repeater or a smarter repeater to improve communications between a base station and UEs.

As indicated above, FIG. 5 is provided as an example. Other examples may differ from what is described with respect to FIG. 5.

Figure 6:
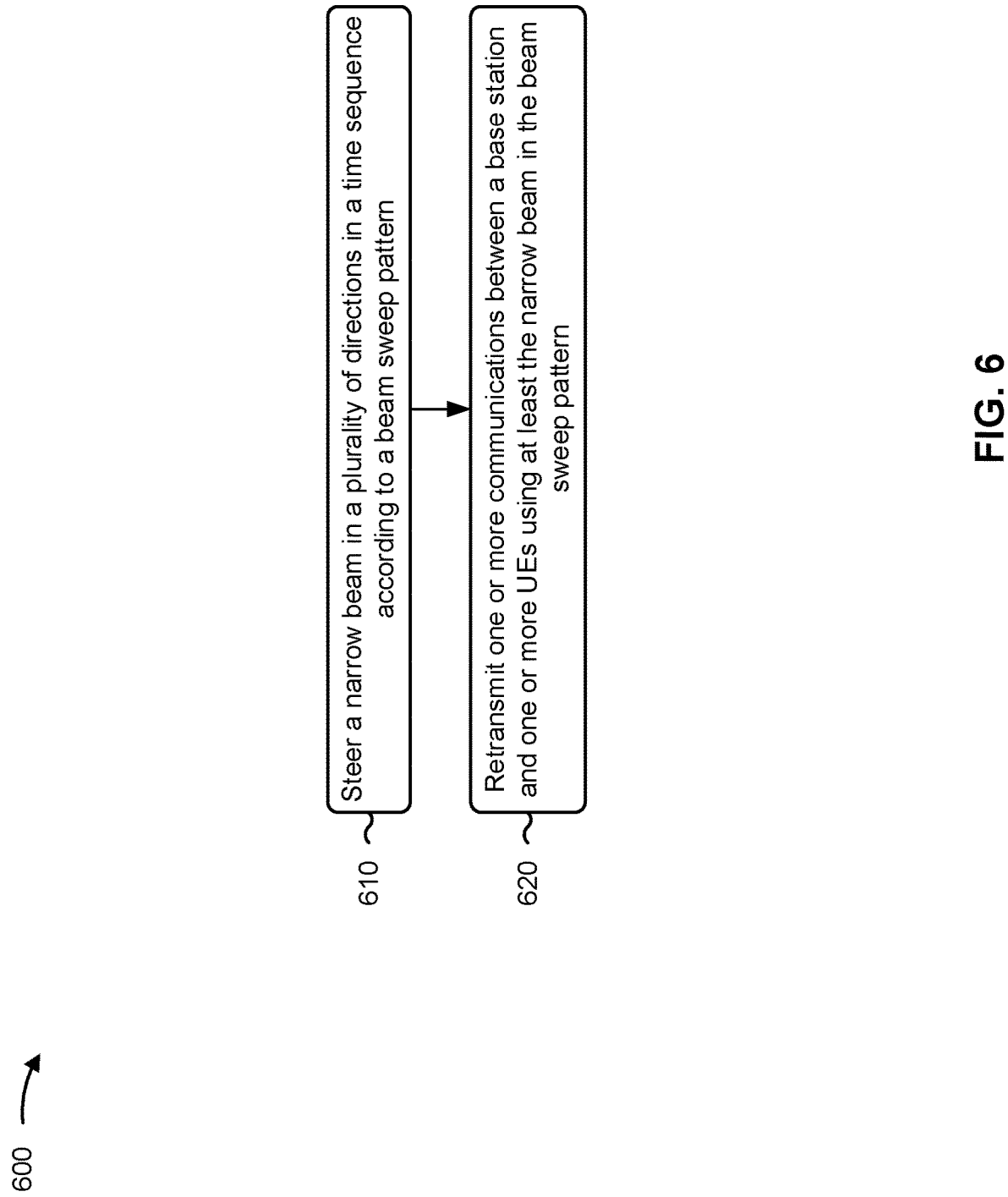
FIG. 6 is a diagram illustrating an example process performed, for example, by a repeater, in accordance with the present disclosure.

FIG. 6 is a diagram illustrating an example process 600 performed, for example, by a repeater, in accordance with the present disclosure. Example process 600 is an example where the repeater (e.g., a repeater 110d depicted in FIGS.

1 and 2, repeaters 420 and 430 depicted in FIGS. 4 and 5) performs operations associated with an analog repeater with a beam sweep.

As shown in FIG. 6, in some aspects, process 600 may include steering a narrow beam in a plurality of directions in a time sequence according to a beam sweep pattern (block 610). For example, the repeater (e.g., using communication unit 294, controller/processor 290, memory 292) may steer a narrow beam in a plurality of directions in a time sequence according to a beam sweep pattern, as described above. The narrow beam in the beam sweep pattern may be between a UE and the repeater.

As further shown in FIG. 6, in some aspects, process 600 may include retransmitting one or more communications between a base station and one or more UEs using at least the narrow beam in the beam sweep pattern (block 620). For example, the repeater (e.g., using communication unit 294, controller/processor 290, memory 292, and/or the like) may retransmit one or more communications between a base station and one or more UEs using at least the narrow beam in the beam sweep pattern, as described above.

Process 600 may include additional aspects, such as any single aspect or any combination of aspects described below and/or in connection with one or more other processes described elsewhere herein.

In a first aspect, the repeater is an analog repeater.

In a second aspect, alone or in combination with the first aspect, retransmitting the one or more communications includes retransmitting the one or more communications in an mmWave frequency band.

In a third aspect, alone or in combination with one or more of the first and second aspects, the beam sweep pattern is independent of base station control.

In a fourth aspect, alone or in combination with one or more of the first through third aspects, steering the narrow beam in the beam sweep pattern includes amplifying a signal from an antenna array of the repeater in a first beam direction for a first period of time and amplifying the signal in a second beam direction for a second period of time, based at least in part on the beam sweep pattern.

In a fifth aspect, alone or in combination with one or more of the first through fourth aspects, the first period of time and the second period of time do not overlap.

In a sixth aspect, alone or in combination with one or more of the first through fifth aspects, the first period of time is equal to or greater than a periodicity of reference signals for beam failure detection.

In a seventh aspect, alone or in combination with one or more of the first through sixth aspects, the beam sweep pattern includes a quantity of beams that is fewer than a threshold quantity of beam failure instances to indicate beam failure detection.

In an eighth aspect, alone or in combination with one or more of the first through seventh aspects, the beam sweep pattern is based at least in part on a quantity of the one or more UEs in one or more respective beam directions at one or more respective times.

In a ninth aspect, alone or in combination with one or more of the first through eighth aspects, process 600 includes configuring the beam sweep pattern based at least in part on information received from the base station regarding a distribution of the one or more UEs In a tenth aspect, alone or in combination with one or more of the first through ninth aspects, the information includes a configuration of the beam sweep pattern.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
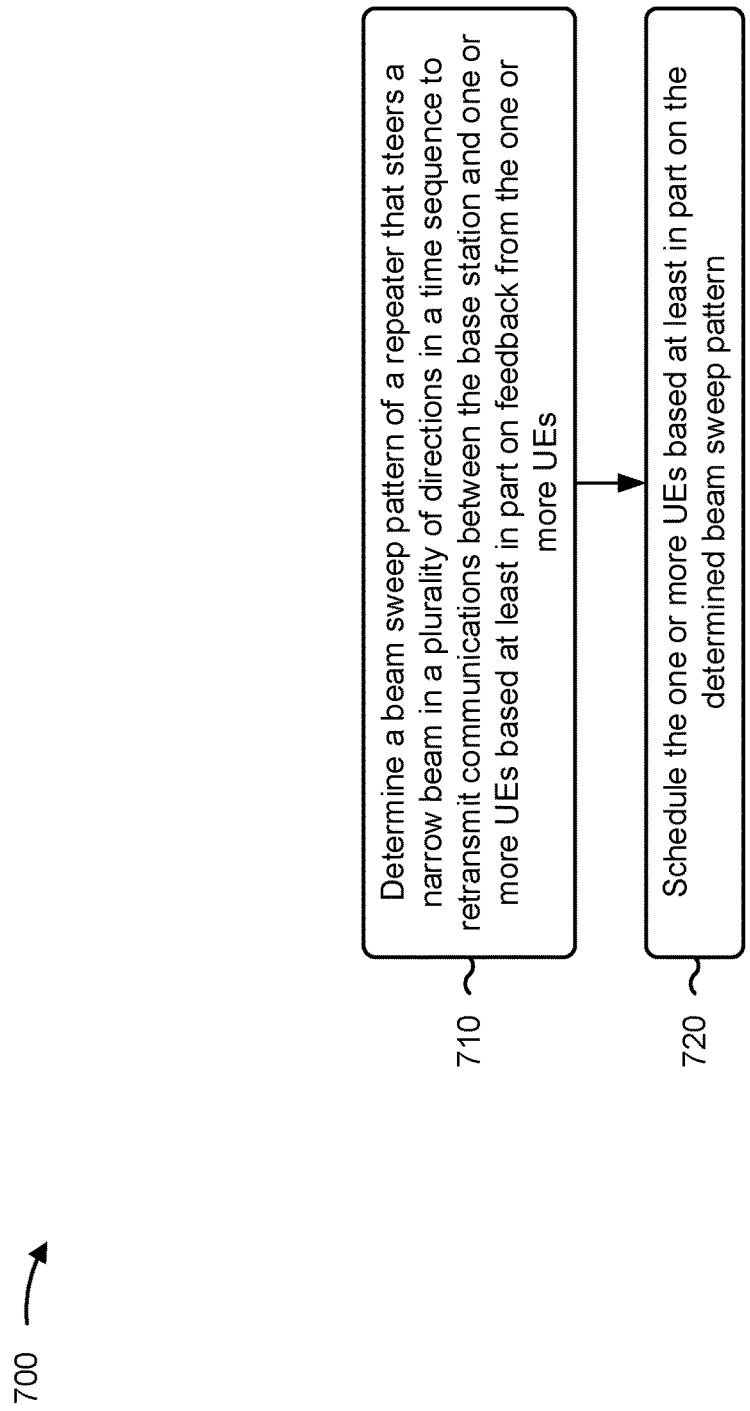
FIG. 7 is a diagram illustrating an example process performed, for example, by a base station, in accordance with the present disclosure.

FIG. 7 is a diagram illustrating an example process 700 performed, for example, by a base station, in accordance with the present disclosure. Example process 700 is an example where the base station (e.g., base station 110, gNB 410 depicted in FIG. 4) performs operations associated with supporting an analog repeater with a beam sweep.

As shown in FIG. 7, in some aspects, process 700 may include determining a beam sweep pattern of a repeater that steers a narrow beam in a plurality of directions in a time sequence to retransmit communications between the base station and one or more UEs, based at least in part on feedback from the one or more UEs (block 710). For example, the base station (e.g., using transmit processor 220, receive processor 238, controller/processor 240, memory 242) may determine a beam sweep pattern of a repeater that steers a narrow beam in a plurality of directions in a time sequence to retransmit communications between the base station and one or more UEs, based at least in part on feedback from the one or more UEs, as described above.

As further shown in FIG. 7, in some aspects, process 700 may include scheduling the one or more UEs based at least in part on the determined beam sweep pattern (block 720). For example, the base station (e.g., using transmit processor 220, receive processor 238, controller/processor 240, memory 242) may schedule the one or more UEs based at least in part on the determined beam sweep pattern, as described above.

Process 700 may include additional aspects, such as any single aspect or any combination of aspects described below and/or in connection with one or more other processes described elsewhere herein.

In a first aspect, the repeater is an analog repeater.

In a second aspect, alone or in combination with the first aspect, the beam sweep pattern is independent of base station control.

In a third aspect, alone or in combination with one or more of the first and second aspects, the feedback from the one or more UEs includes one or more of a CQI, a physical downlink channel acknowledgement (ACK), or a physical downlink channel negative acknowledgment (NACK).

In a fourth aspect, alone or in combination with one or more of the first through third aspects, scheduling the one or more UEs includes scheduling a particular UE of the one or more UEs to communicate when the beam is steered toward the particular UE and to not communicate when the beam is not steered toward the particular UE.

In a fifth aspect, alone or in combination with one or more of the first through fourth aspects, scheduling the one or more UEs includes scheduling the one or more UEs to avoid beam failure recovery procedures by the one or more UEs.

In a sixth aspect, alone or in combination with one or more of the first through fifth aspects, process 700 includes transmitting, to the repeater, information about a distribution of the one or more UEs.

In a seventh aspect, alone or in combination with one or more of the first through sixth aspects, the information includes a configuration for the beam sweep pattern for the repeater that is based at least in part on a distribution of the one or more UEs.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

The following provides an overview of some Aspects of the present disclosure:

Aspect 1: A method of wireless communication performed by a repeater, comprising: steering a narrow beam in a plurality of directions in a time sequence according to a beam sweep pattern; and retransmitting one or more communications between a base station and one or more user equipments (UEs) using at least the narrow beam in the beam sweep pattern.

Aspect 2: The method of Aspect 1, wherein the repeater is an analog repeater.

Aspect 3: The method of Aspect 1 or 2, wherein retransmitting the one or more communications includes retransmitting the one or more communications in a millimeter wave frequency band.

Aspect 4: The method of any of Aspects 1-3, wherein the beam sweep pattern is independent of base station control.

Aspect 5: The method of any of Aspects 1-4, wherein steering the narrow beam in the beam sweep pattern includes amplifying a signal from an antenna array of the repeater in a first beam direction for a first period of time and amplifying the signal in a second beam direction for a second period of time, based at least in part on the beam sweep pattern.

Aspect 6: The method of Aspect 5, wherein the first period of time and the second period of time do not overlap.

Aspect 7: The method of Aspect 5, wherein the first period of time is equal to or greater than a periodicity of reference signals for beam failure detection.

Aspect 8: The method of any of Aspects 1-7, wherein the beam sweep pattern includes a quantity of beams that is fewer than a threshold quantity of beam failure instances to indicate beam failure detection.

Aspect 9: The method of any of Aspects 1-8, wherein the beam sweep pattern is based at least in part on a quantity of the one or more UEs in one or more respective beam directions at one or more respective times.

Aspect 10: The method of any of Aspects 1-9, further comprising configuring the beam sweep pattern based at least in part on information received from the base station regarding a distribution of the one or more UEs.

Aspect 11: The method of Aspect 10, wherein the information includes a configuration of the beam sweep pattern.

Aspect 12: A method of wireless communication performed by a base station, comprising: determining a beam sweep pattern of a repeater that steers a narrow beam in a plurality of directions in a time sequence to retransmit communications between the base station and one or more user equipments (UEs), based at least in part on feedback from the one or more UEs; and scheduling the one or more UEs based at least in part on the determined beam sweep pattern.

Aspect 13: The method of Aspect 12, wherein the repeater is an analog repeater.

Aspect 14: The method of Aspect 12 or 13, wherein the beam sweep pattern is independent of base station control.

Aspect 15: The method of any of Aspects 12-14, wherein the feedback from the one or more UEs includes one or more of a channel quality indicator, a physical downlink channel acknowledgement, or a physical downlink channel negative acknowledgement.

Aspect 16: The method of any of Aspects 12-15, wherein scheduling the one or more UEs includes scheduling a particular UE of the one or more UEs to communicate when the beam is steered toward the particular UE and to not communicate when the beam is not steered toward the particular UE.

Aspect 17: The method of any of Aspects 12-16, wherein scheduling the one or more UEs includes scheduling the one or more UEs to avoid beam failure recovery procedures by the one or more UEs.

Aspect 18: The method of any of Aspects 12-17, further comprising transmitting, to the repeater, information about a distribution of the one or more UEs.

Aspect 19: The method of Aspect 18, wherein the information includes a configuration for the beam sweep pattern for the repeater that is based at least in part on a distribution of the one or more UEs.

Aspect 20: An apparatus for wireless communication at a device, comprising a processor; memory coupled with the processor; and instructions stored in the memory and executable by the processor to cause the apparatus to perform the method of one or more Aspects of Aspects 1-19.

Aspect 21: A device for wireless communication, comprising a memory and one or more processors coupled to the memory, the memory and the one or more processors configured to perform the method of one or more Aspects of Aspects 1-19.

Aspect 22: An apparatus for wireless communication, comprising at least one means for performing the method of one or more Aspects of Aspects 1-19.

Aspect 23: A non-transitory computer-readable medium storing code for wireless communication, the code comprising instructions executable by a processor to perform the method of one or more Aspects of Aspects 1-19.

Aspect 24: A non-transitory computer-readable medium storing a set of instructions for wireless communication, the set of instructions comprising one or more instructions that, when executed by one or more processors of a device, cause the device to perform the method of one or more Aspects of Aspects 1-19.

As used herein, the term "component" is intended to be broadly construed as hardware, firmware, and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware, firmware, and/or a combination of hardware and software.

It will be apparent that systems and/or methods described herein may be implemented in different forms of hardware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A repeater for wireless communication, comprising:
 a memory; and
 one or more processors, coupled to the memory, configured to:
  steer a narrow beam in a plurality of beam directions in a time sequence according to a beam sweep pattern comprising amplifying a signal, from an antenna array of the repeater, in a first beam direction of the plurality of beam directions for a first period of time of the time sequence, wherein at least one of:
   the first period of time and a second period of time do not overlap,
    the second period of time being associated with amplifying the signal in a second beam direction of the plurality of beam directions for a second period of time of the time sequence, or
   the first period of time is equal to or greater than a periodicity of reference signals for beam failure detection; and
  retransmit one or more communications between a network node and one or more user equipments (UEs) using at least the narrow beam in the beam sweep pattern,
   wherein the repeater is an analog repeater that does not comprise a digital signal processing chain.

2. The repeater of claim 1, wherein the one or more processors, to retransmit the one or more communications, are configured to retransmit the one or more communications in a millimeter wave frequency band.

3. The repeater of claim 1, wherein the beam sweep pattern is independent of network node control.

4. The repeater of claim 1, wherein the beam sweeping pattern further comprises amplifying the signal in the second beam direction for the second period of time.

5. The repeater of claim 1, wherein the first period of time and the second period of time do not overlap.

6. The repeater of claim 1, wherein the first period of time is equal to or greater than the periodicity of reference signals for beam failure detection.

7. The repeater of claim 1, wherein the beam sweep pattern includes a quantity of beam positions that is fewer than a threshold quantity of beam failure instances to indicate beam failure detection.

8. The repeater of claim 1, wherein the beam sweep pattern is based at least in part on a quantity of the one or more UEs in one or more respective beam directions of the plurality of beam directions at one or more respective times of the time sequence.

9. The repeater of claim 1, wherein the one or more processors are configured to configure the beam sweep pattern based at least in part on information received from the network node regarding a distribution of the one or more UEs.

10. The repeater of claim 9, wherein the information includes a configuration of the beam sweep pattern.

11. The repeater of claim 1, wherein the one or more processors are further configured to receive a communication using at least the narrow beam in the beam sweep pattern.

12. The repeater of claim 1, wherein the one or more processors are further configured to perform an initial transmission of the one or more communications to the network node on a different beam than the narrow beam in the beam sweep pattern.

13. A method of wireless communication performed by a repeater, comprising:
 steering a narrow beam in a plurality of beam directions in a time sequence according to a beam sweep pattern comprising amplifying a signal, from an antenna array of the repeater, in a first beam direction of the plurality of beam directions for a first period of time of the time sequence, wherein at least one of:
  the first period of time and a second period of time do not overlap,
   the second period of time being associated with amplifying the signal in a second beam direction of the plurality of beam directions for a second period of time of the time sequence, or
  the first period of time is equal to or greater than a periodicity of reference signals for beam failure detection; and
 retransmitting one or more communications between a network node and one or more user equipments (UEs) using at least the narrow beam in the beam sweep pattern,
  wherein the repeater is an analog repeater that does not comprise a digital signal processing chain.

14. The method of claim 13, wherein the beam sweep pattern is independent of network node control.

15. The method of claim 13, wherein the beam sweeping pattern further comprises amplifying the signal in the second beam direction for the second period of time.

16. The method of claim 13, wherein the first period of time and the second period of time do not overlap.

17. The method of claim 13, wherein the first period of time is equal to or greater than the periodicity of reference signals for beam failure detection.

18. The method of claim 13, wherein the beam sweep pattern includes a quantity of beams that is fewer than a threshold quantity of beam failure instances to indicate beam failure detection.

19. The method of claim 13, wherein the beam sweep pattern is based at least in part on a quantity of the one or more UEs in one or more respective beam directions of the plurality of beam directions at one or more respective times of the time sequence.

20. A non-transitory computer-readable medium storing a set of instructions for wireless communication, the set of instructions comprising:
one or more instructions that, when executed by one or more processors of a repeater, cause the repeater to:
steer a narrow beam in a plurality of beam directions in a time sequence according to a beam sweep pattern comprising amplifying a signal, from an antenna array of the repeater, in a first beam direction of the plurality of beam directions for a first period of time of the time sequence, wherein at least one of:
the first period of time and a second period of time do not overlap,
the second period of time being associated with amplifying the signal in a second beam direction of the plurality of beam directions for a second period of time of the time sequence, or
the first period of time is equal to or greater than a periodicity of reference signals for beam failure detection; and
retransmit one or more communications between a network node and one or more user equipments (UEs) using at least the narrow beam in the beam sweep pattern,
wherein the repeater is an analog repeater that does not comprise a digital signal processing.

21. The non-transitory computer-readable medium of claim 20, wherein the repeater is an analog repeater.

22. The non-transitory computer-readable medium of claim 20, wherein the one or more instructions, that cause the repeater to retransmit the one or more communications, cause the repeater to retransmit the one or more communications in a millimeter wave frequency band.

23. The non-transitory computer-readable medium of claim 20, wherein the beam sweep pattern is independent of network node control.

24. The non-transitory computer-readable medium of claim 20, wherein the beam sweep pattern further comprising amplifying the signal in the second beam direction for the second period of time.

25. The non-transitory computer-readable medium of claim 20, wherein the beam sweep pattern includes a quantity of beams that is fewer than a threshold quantity of beam failure instances to indicate beam failure detection.

26. An apparatus for wireless communication, comprising:
means for steering a narrow beam in a plurality of beam directions in a time sequence according to a beam sweep pattern comprising amplifying a signal, from an antenna array of the apparatus, in a first beam direction of the plurality of beam directions for a first period of time of the time sequence, wherein at least one of:
the first period of time and a second period of time do not overlap,
the second period of time being associated with amplifying the signal in a second beam direction of the plurality of beam directions for a second period of time of the time sequence, or
the first period of time is equal to or greater than a periodicity of reference signals for beam failure detection; and
means for retransmitting one or more communications between a network node and one or more user equipments (UEs) using at least the narrow beam in the beam sweep pattern,
wherein the apparatus is an analog apparatus that does not comprise a digital signal processing.

27. The apparatus of claim 26, wherein the beam sweep pattern includes a quantity of beams that is fewer than a threshold quantity of beam failure instances to indicate beam failure detection.

28. The apparatus of claim 26, wherein the means for retransmitting the one or more communications are configured for retransmitting the one or more communications in a millimeter wave frequency band.

29. The apparatus of claim 26, wherein the beam sweep pattern is independent of network node control.

30. The apparatus of claim 26, wherein beam sweeping pattern further comprises amplifying the signal in the second beam direction for the second period of time.

* * * * *